United States Patent [19]

Irwin et al.

[11] Patent Number: 5,773,540
[45] Date of Patent: Jun. 30, 1998

[54] MOLD ASSEMBLY FOR THERMO-FORMING MACHINE

[75] Inventors: Jere F. Irwin; Gerald M. Corbin, both of Yakima; Dale L. Vantrease, Naches, all of Wash.

[73] Assignee: Irwin Research and Development, Inc., Yakima, Wash.

[21] Appl. No.: 960,950

[22] Filed: Oct. 30, 1997

Related U.S. Application Data

[63] Continuation of Ser. No. 632,930, Apr. 16, 1996, abandoned.

[51] Int. Cl.⁶ .................................................. B29C 51/26
[52] U.S. Cl. ...................... 425/387.1; 425/388; 425/503; 425/504
[58] Field of Search ............................... 425/388, 387.1, 425/395, 398, 503, 504, DIG. 48

[56] References Cited

U.S. PATENT DOCUMENTS

| | | |
|---|---|---|
| 3,142,863 | 8/1964 | Mazzoni . |
| 3,161,915 | 12/1964 | Thiel . |
| 3,837,782 | 9/1974 | Meissner et al. ........................ 425/388 |
| 4,009,981 | 3/1977 | Rosen ...................................... 425/388 |
| 4,149,841 | 4/1979 | Patterson ................................ 425/398 |
| 4,328,067 | 5/1982 | Cesano ................................... 425/395 |
| 4,368,024 | 1/1983 | Asano ..................................... 425/388 |
| 4,560,339 | 12/1985 | Padovani ................................. 425/437 |
| 4,872,826 | 10/1989 | Padovani ................................. 425/388 |
| 4,878,826 | 11/1989 | Wendt ..................................... 425/388 |
| 4,971,541 | 11/1990 | Onnenberg et al. ..................... 425/388 |
| 5,130,071 | 7/1992 | Iseler et al. ............................. 425/388 |
| 5,307,610 | 5/1994 | Schneider et al. ...................... 425/398 |

FOREIGN PATENT DOCUMENTS 2149717  11/1984  United Kingdom .

*Primary Examiner*—Jay H. Woo
*Assistant Examiner*—Ivrie Schwartz
*Attorney, Agent, or Firm*—Wells, St. John, Roberts, Gregory & Matkin P.S.

[57] ABSTRACT

An improved mold assembly is provided for use in a thermo-forming press having a first and a second platen movably engageable there between. A first die member of the assembly is configured to be carried by the first platen. A second die member is configured to be carried by the second platen, and is constructed and arranged to mate in assembly with the first die member. Aa resilient member is disposed between one of the die members and an associated one of the platens. The compliant member is constructed and arranged to provide compliant engagement between the first and second die as first and second platens on which they are mounted, respectively, are engaged together to form a web of plastic material there between during a thermo-forming cycle.

16 Claims, 4 Drawing Sheets

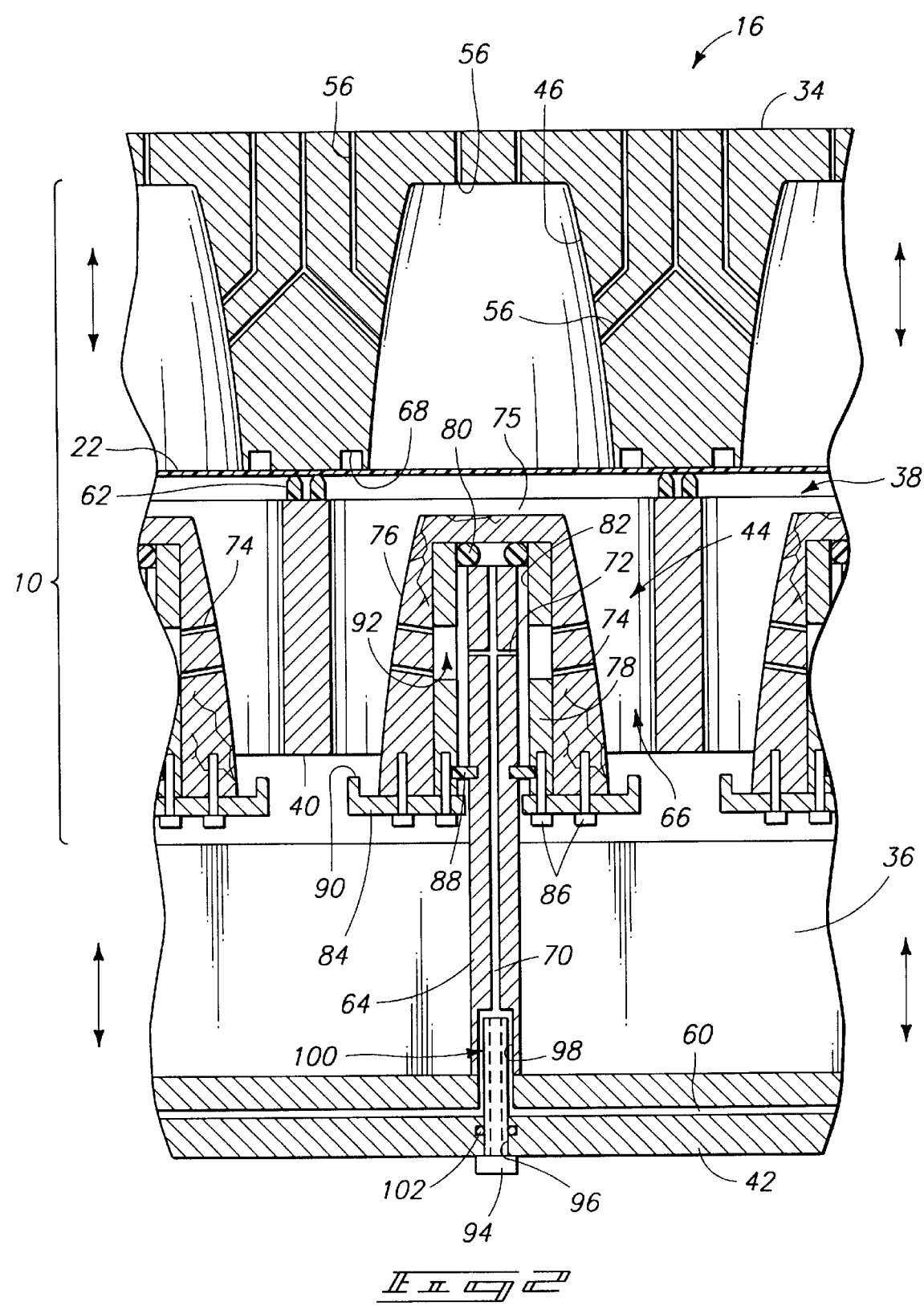

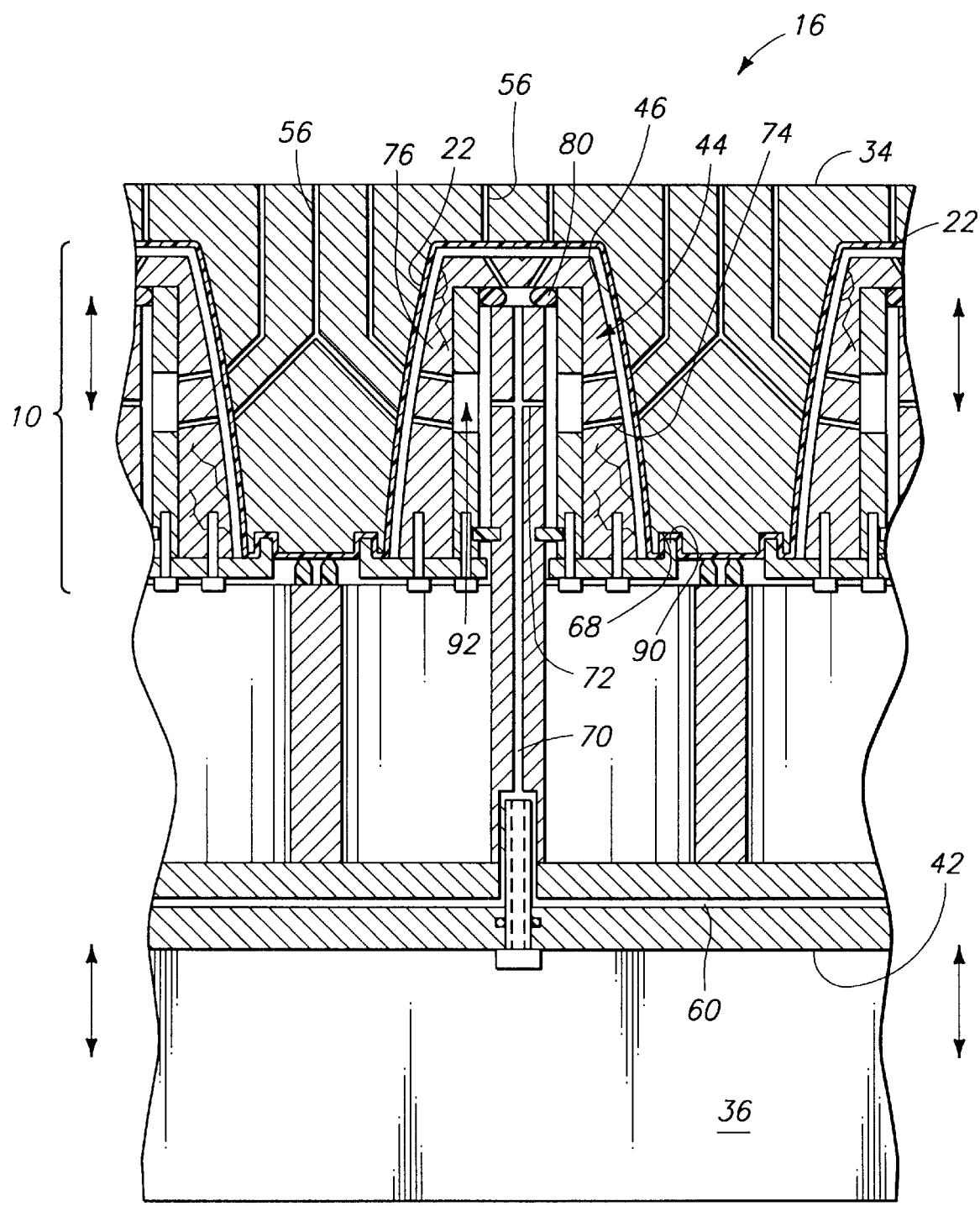

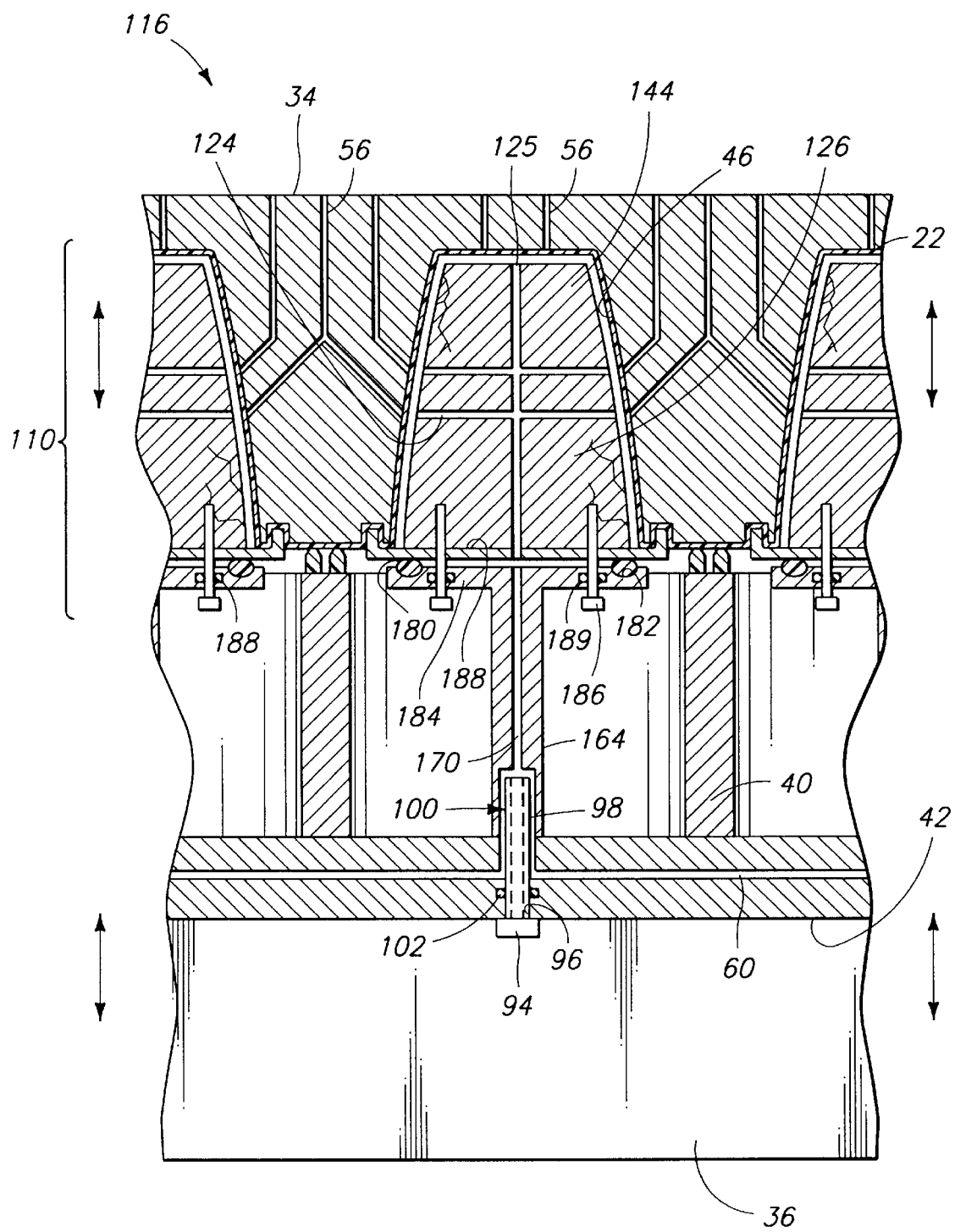

MOLD ASSEMBLY FOR THERMO-FORMING MACHINE

RELATED PATENT DATA

This patent resulted from a file wrapper continuation application of U.S. application Ser. No. 08/632,930, filed on Apr. 16, 1996, now abandoned entitled "An Improved Mold Assembly and Seal Arrangement for Use With a Thermo-Forming Machine" listing the inventor as Jere F. Irwin.

TECHNICAL FIELD

This invention relates to apparatus for thermo-forming thin walled plastic articles.

BACKGROUND OF THE INVENTION

During the manufacture and forming of many products from sheets or webs of plastic material, thermo-forming machines are used to simultaneously mold large quantities of plastic thin-walled articles. A typical molded article has one of a large variety of generally cup-shaped constructions being provided with two-piece dies or molds suitable for imparting to the finished piece its final desired shape. A typical thermo-forming machine has a pair of mating male and female dies, or molds that are brought together on opposed sides of a pre-heated web of plastic material, during an operating cycle. Usually, a plurality of mating male and female dies are provided on bottom and top platens, or die carriers, respectively, enabling production of a plurality of articles during a single cycle of operation.

Such prior devices have provided vast improvements to the rate with which articles can be produced from a single machine. To enable continuous and undelayed production, a typical thermo-forming machine is driven by one or more of electric drive motors. Alternatively, hydraulic or pneumatic actuators can be used to impart motion to a thermo-forming machine. Additionally, a control system or even a complex arrangement of kinematic linkages choreograph the associated movements of feeding, heating, and forming of plastic articles by the machine.

As the number of dies provided on the platens of a thermo-forming machine is increased, one problem arises in maintaining a uniform closure of each mating pair of male and female die across the entire face of the top and bottom platens. Therefore, improvements are needed to ensure uniform closure between each of the pairs of mating dies in a thermo-forming machine.

Previously, clamping members have been provided on thermo-forming machines that encircle each female die of an array of dies to ensure positive clamping of the web about each die during forming. Additionally, the clamping members stabilize the web from moving during molding. Furthermore, resilient engaging edges have also been provided on the clamping members to ensure clamping, even where irregular surface contact occurs with an opposed platen. However, for large platens having a large number of die, such clamping often proves only partially effective.

Furthermore, for purposes of applying a vacuum within the female die to facilitate vacuum molding, such clamping members do not seal the female die with the web of plastic. However, a large amount of vacuum needs to be pulled across the entire mold surface area of a platen. Therefore, improvements are needed to reduce the amount of vacuum that is needed to draw a web of preheated thermo-formable plastic into each individual die of a platen. A reduction in the amount of vacuum which needs to be drawn will speed up the cycle time and productivity of the thermo-forming machine The objective of the present invention is to provide a vastly improved mold assembly and a mold seal arrangement for use with a thermo-forming machine.

BRIEF DESCRIPTION OF THE DRAWINGS

Preferred embodiments of the invention are described below with reference to the following accompanying drawings.

FIG. 2 is a vertical sectional view of a pair of open male and female die and a closed clamping member, before thermo-forming of a thin-walled article from a web of thermo-formable plastic material according to the machine of FIG. 1;

FIG. 3 is a vertical sectional view of the die of FIG. 2 in a closed position, during a thermo-forming operation; and FIG. 4 is a vertical sectional view of an alternatively constructed pair of open male and female die for use in the machine of FIG. 1.

DETAILED DESCRIPTION OF THE PREFERRED EMBODIMENTS

Figure 1:
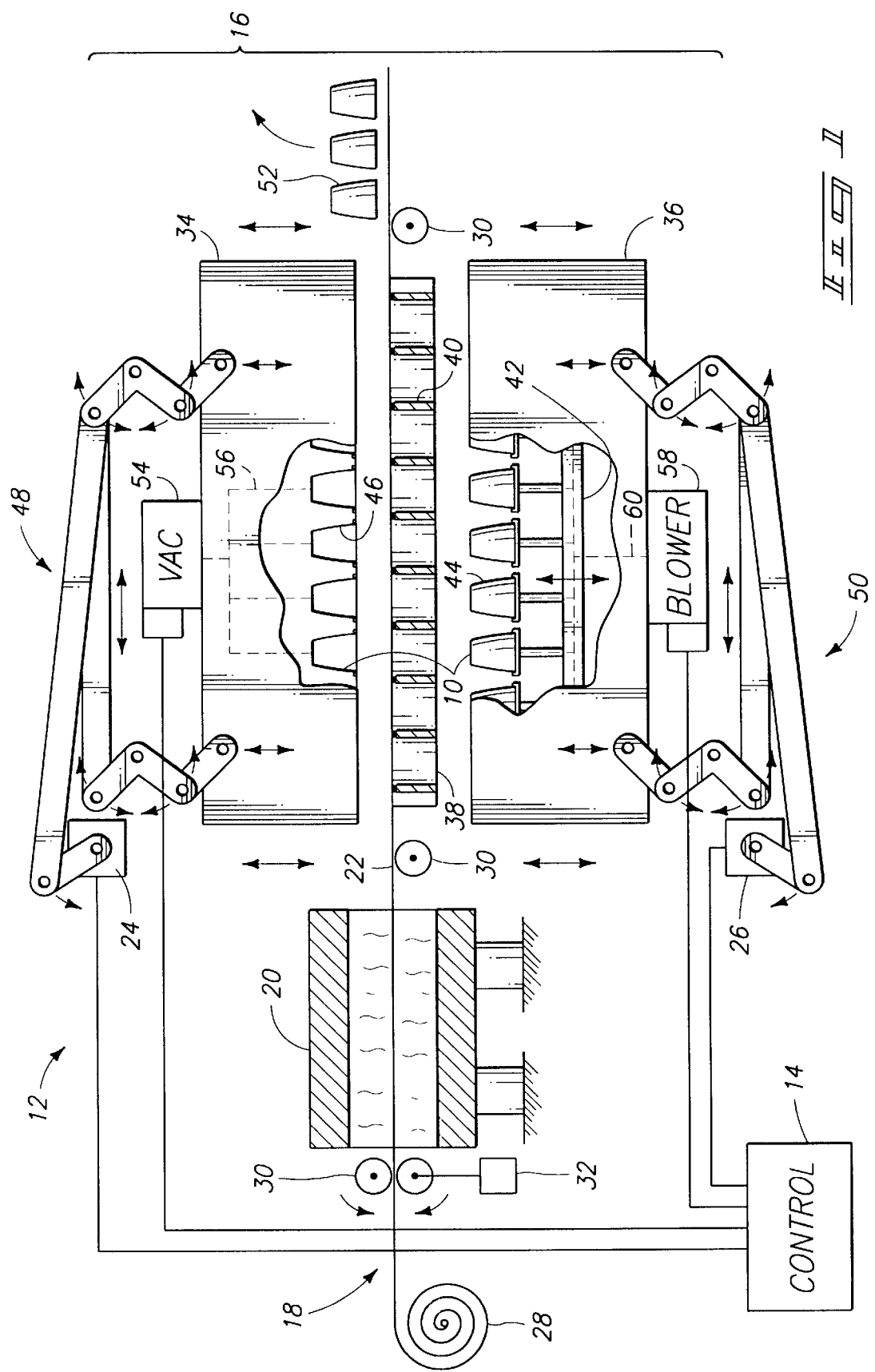
FIG. 1 is a schematic side view representation of a thermo-forming machine that utilizes an improved mold seal arrangement in accordance with a preferred embodiment of the invention.

This disclosure of the invention is submitted in furtherance of the constitutional purposes of the U.S. Patent Laws "to promote the progress of science and useful arts" (Article 1, Section 8).

In accordance with one aspect of this invention an improved mold assembly is provided for use in a thermo-forming press having a first and a second platen movably engageable there between. A first die member of the assembly is configured to be carried by the first platen. A second die member is configured to be carried by the second platen, and is constructed and arranged to mate in assembly with the first die member. A resilient member is disposed between one of the die members and an associated one of the platens. The compliant member is constructed and arranged to provide compliant engagement between the first and second die members as first and second platens on which they are mounted, respectively, are engaged together to form an article from a web of plastic material there between during a thermo-forming cycle.

In accordance with another aspect of this invention an improved mold assembly is provided for use in a thermo-forming press having a first and a second platen movably engageable there between. A first die member having a cavity and a circumferential groove extending about the cavity is configured to be carried by the first platen. A second die member is configured to be carried by the second platen and has a plug constructed and arranged to mate in assembly with the cavity, forcing a heated web of plastic material into the cavity during a molding step. The circumferential groove and lip flange are constructed and arranged to mate in engagement upon mating of the respective die about a web being formed there between, forming a web seal there along.

A preferred embodiment of an improved mold assembly is generally designated with the reference numeral 10. For purposes of illustration, an array of mold assemblies 10 are formed in a single thermo-forming machine configured for cycle-based operation, and designated generally with reference numeral 12. A machine control system 14 is implemented in a combination of software and hardware on an engineering workstation to control the operation of machine 12. It is envisioned that any of a number of presently available machine control systems can be used, including combinations of purely mechanical kinematic linkages.

Thermal forming machine 12 includes a thermal forming rotary driven press 16, a feeding conveyor 18, and a heating oven 20. Press 16 is raised and lowered by one or more solenoid drives 24 and 26 onto a web 22 of plastic material to be formed. Alternatively, hydraulic or pneumatic cylinders can be used to drive machine 12. The web of material is fed into press 16 from a roll 28, guided by a plurality of spaced apart rollers 30. At least one of the rollers is driven in rotation by a solenoid drive 32, enabling advancement of the web 22 into press 16. In operation, it becomes necessary to choreograph movement of the press 16 and the conveyor 18 in order to optimize the production rate of parts being formed in machine 12. For example, conveyor 18 is operated so as to feed web 22 when press 16 is open, allowing feeding of new material to be formed within the press. However, conveyor 18 is stopped when press 16 is closed or nearly closed, during an actual thermo-forming step.

Thermo-forming press 16 has a top platen 34 and a bottom platen 36 that are independently movable between opened and closed positions by rotary solenoid drives 24 and 26 via associated drive linkages. Furthermore, an independently movable plug support plate 42 is carried within the bottom platen 36. Plug support plate 42 is vertically movable between lowered and raised positions from bottom platen 36. Top platen 34 engages, when lowered, against a unitary grid 38 of stationary clamping members 40, clamping web 22 there between. Bottom platen 36 is then raised, to encircle unitary clamping grid 38 and mate with the bottom of top platen 34. Subsequently, plug support plate 42 is raised, causing individual plugs 44 carried thereon to draw clamped portions of heated web 22 into individual associated cavities 46 provided in top platen 34. During a web molding operation, plug support plate 42 is raised into the heated web 22, which causes the web to stretch into the associated cavities, or mold surfaces where it is shaped therein.

The drive linkages depicted in FIG. 1 are formed from a pair of top and bottom crank arm assemblies 48 and 50. Each assembly 48 and 50 is formed from a crank arm linkage and a four-bar linkage, wherein the crank arm linkage drives the four bar linkage in an oscillating motion. Each platen 34 and 36 is driven by assembly 48 and 50, respectively, in substantially non-rotating linear motion. Assemblies 48 and 50 are driven into coacting engagement by drives 24 and 26, respectively. Essentially, each drive forms the motor of an associated rotary press, attaching to a rotating crank arm assembly that moves the associated four-bar linkage. The linkage causes the attached platen to move up and down in response to rotation of the drive. Accordingly, a single revolution of drives 24 and 26 produces a corresponding complete press cycle of the top and bottom platens 34 and 36, respectively. Hence, a complete cycle of each drive returns the press to a starting, or closed position. For example, when drive 24 is at an initial rotated position of 0 degrees, the top platen 34 is closed onto web 22. Similarly, when drive 24 is rotated to 180 degrees, top platen 34 is completely opened. Likewise, the same holds true for drive 26 and bottom platen 36.

To further ensure aligned axial opening and closing between platens 34 and 36, top platen 34 and bottom platen 36 are slidably carried by four guide pins (not shown). The pins are supported vertically from a central frame (not shown). Guide bushings (not shown) are mounted and arranged in the top and bottom platens 34 and 36 to slidably receive each pin. Similarly, plug support plate 42 is slidably carried on bottom platen 36 via a plurality of guide pins and bushings, and is moved by a dedicated servo drive and crank arm assembly (not shown) similar to assemblies 48 and 50.

However, it is still impossible in practice to ensure completely parallel and even closure between platens 34 and 36. Uneven wear between the platens resulting from repeated contact, loosening and wear of drive linkages and guide pins, and uneven forces induced during forming can all lead to uneven pressure and die placement across the platen contact faces. Furthermore, as the number of different mold assemblies 10 carried on a press is increased, the likelihood of mis-match between closing dies tends to increase. Therefore, compliant die features of this invention are needed to overcome such uneven closure problems.

Thermo-forming machine 12 of FIG. 1 is configured to mold thermo-formed plastic parts, or articles 52 from the web 22 of plastic material. Parts are formed from web 22 as it is intermittently passed or fed, prior to each new press cycle, between the top and bottom platens 34 and 36, and over clamping grid 38. Once the heated web 22 has been advanced into position to begin a new press cycle, top and bottom platens 34 and 36 are closed onto the web 22. Next, plug support plate 42 is raised into web 22, drawing the clamped web 22 into each cavity 46 due to each advancing plug 44. A vacuum source 54 is then used to apply a vacuum to a piece of the web 22 that has been heated by passing it through oven 20. Furthermore, pressure is applied from the plug side of each mold assembly 10, as discussed below.

Once press 16 has been closed, a vacuum is applied via vacuum feedlines 56 to cavities 46 formed within the top platen 34. Vacuum source 54 is preferably formed from a vacuum pump and a pressure vessel in which a vacuum is applied. Similarly, a blower source 58 is provided with blower feedlines 60 configured to apply positive pressure from within plugs 44 via bottom platen 36 during molding. Blower source 58 is preferably formed from a compressor and a pressure vessel in which a store of pressurized gas is stored and applied via feedlines 60.

In operation, clamping grid 38 serves as a web retaining clamp for fixing web 22 within machine 12 of FIG. 1 during each molding cycle. Individual clamping members 40 are preferably formed from individual cylindrical tubes that are welded together, forming a plurality of adjacently nested cylindrical tubes. Each tube is positioned so as to encircle the outer periphery of each cavity 46 in top platen 34, upon being lowered into contact therewith. Hence, each clamping member 40 fixes adjacent portions of heated web 22 from moving as plug support plate 42 is raised during a molding operation. When top platen 34 is raised, web 22 is released, enabling the web 22 to be advanced by one or more pairs of rollers 30 that are drive by a servo drive 32. This movement allows web 22 to be advanced in preparation for the next part forming operation to be implemented by machine 12. A pneumatic solenoid is constructed and arranged to electrically activate vacuum source 54, thereby enabling application of vacuum during a part forming step by activating the source. Release of the vacuum prior to releasing the parts 52 is realized by deactivating the source. Similarly, a pneumatic solenoid is constructed and arranged to electrically activate and deactivate blower source 58, thereby enabling application of pressure during part forming by activating the source, and enabling release of pressure after release of parts 52 by deactivating the source. Additionally, or alternatively, a separate web retaining clamp can be provided at one end of press 16 to secure web 22 from being advanced during a molding operation.

In operation, drives 24 and 26 and the solenoids controlling vacuum source 54 and blower source 58 are activated and deactivated by control system 14 to control operation of the machine 12. Various software-based control schemes can be implemented to choreograph their respective motions. For example, the displacement of each part can be realized by tracking the operation of each drive or solenoid.

FIG. 2 illustrates a center line sectional view of a typical mold assembly 10 of press 16 (depicted in FIG. 1). Top platen 34 is depicted in a lowered configuration, engaging pre-heated web 22 between a cylindrical clamping member 40 of grid 38 and the platen 34. Clamping grid 38 is depicted in it's normal stationary position, wherein web 22 is passed across the top of grid 38 when press 16 is open. Bottom platen 36 is depicted in it's lowered position, prior to being raised about clamping grid 38, in contact with the bottom of web 22 and top platen 34. Additionally, plug support plate 42 is depicted in FIG. 2 in its lowered position, supporting plug 44 atop a mounting post 64 so that it can be subsequently raised through opening 66 within clamping member 40, causing web 22 to deform inwardly into cavity 46 of top platen 34.

A resilient lip edge member 62 is formed atop each of clamping members 40, ensuring a positive clamping of web 22 between top platen 34 and the associated clamping member 40 carried by grid 38. One suitable construction for lip edge member 62 is formed from a rigid synthetic rubber material. Alternatively, any of a number of resilient and heat resistant materials can be used to form member 62. Further alternatively, clamping member 40 can be formed with a top bevel edge, eliminating the need to provide a separate lip edge member 62 there along. Various alternative devices for clamping web 22 between top platen 34 and clamping member 40 are envisioned with such a construction.

According to FIG. 2, top platen 34 has a plurality of cavities 46 formed within a bottom surface. A circumferential groove 68 is formed about each cavity 46 to enable sealed engagement with a mating portion of plug 44 by trapping web 22 between them, upon raised engagement therein. Vacuum feedlines 56 branch out into a plurality of smaller feedlines 56 for applying vacuum within cavity 46 along various surfaces. The branched array of feedlines 56 facilitate the vacuum induced engagement of heated web 22 with inner surfaces of cavity 46 during a molding operation, in addition to press forces that are simultaneously produced between pairs of mating die of a mold assembly 10. Typically, the surface formed by cavity 46 is cooler than web 22, causing cooling of web 22 as a vacuum sucks the web into contact with cavity 46. In operation, each of vacuum feedlines 56 receives a supply of vacuum from vacuum source 54 (of FIG. 1).

Plug support plate 42 of FIG. 2 is constructed and arranged to support each of plugs 44 atop a dedicated mounting post 64. Additionally, a plurality of blower feedlines 60 supply a source of pressurized gas from blower source 58 (of FIG. 1), to each of plugs 44. Feedline 60 delivers gas to a central delivery bore 70 formed centrally of each post 64. At least one transverse bore 72 feeds pressurized gas to a plurality of side ports 74 that are formed in an outer most wooden mold 76 of plug 44. A metal carrier 78 supports wooden mold 76 in axially slidable relation on mounting post 64. Similarly, wooden mold 76 is also secured via fasteners 86 to base bezel 84. Preferably, mold 76 is formed from balsa wood. Furthermore, a resilient circumferential seal 88 is carried within bezel 84 to ensure sealing between plug 44 and mounting post 64 as pressurized gas is delivered there through. Namely, plug 44 is formed from mold 76 and metal carrier 78, wherein seal 88 and o-ring 80 enable compliant axial movement of plug 44 along mounting post 64.

A resilient mounting o-ring 80 is seated between wooden mold 76 and mounting post 64, ensuring a compliant placement of wooden mold 76 into cavity 46 during a molding operation, O-ring 80 forms a resilient member that is disposed between plug 44 and platen 36. Preferably, o-ring 80 is formed from a resilient elastomeric material, such as synthetic rubber. Alternatively, o-ring 80 can be formed from any of a number of resilient materials which are compressible, yet have a relatively stiff spring-constant. Furthermore, the resilient member can be formed from any of a number of geometries, including washer-shaped, web-shaped, and spherical-shaped pieces of resilient elastomeric material. O-ring 80 is further contained within an elongated metal tube 82 of metal carrier 78. Additionally, metal base bezel 84 is secured to tube 84 by threaded fasteners 86.

Base bezel 84 includes an upturned circumferential lip flange 90 constructed and arranged to mate in engagement with circumferential groove 68. Engaged lip flange 90 and groove 68 entrap web 22 there between in sealed relation there along, according to the construction depicted in FIGS. 2 and 3. Hence, web 22 is forced into groove 68 upon closure therein, forming an air tight seal of web 22 about cavity 46. Additionally, or alternatively, lip flange 90 and circumferential groove 68 can be configured with edges that coact to form a scissors-action there between. Such action shall cut web 22 upon complete closure of plug 44 within cavity 46, yet still clamp or retain the cut web during forming of a part there from.

Tube 82 of FIG. 2 has a plurality of elongate slots 92 formed in the walls for delivering pressurized gas from bores 72 for delivery through side port 74 to act upon web 22 during a molding operation there along. Slots 92 enable relative axial displacement between tube 82 and plug 44, while enabling continued fluid flow communication between bore 70 and side ports 74. Alternatively, any of a number of other flow path configurations can be used.

Plugs 44 are mounted atop support plate 42 with a threaded fastener 94. Fastener 94 is received through a hole 96 in plate 42 for mating in threaded engagement with a threaded receiving bore 98 in a bottom end of post 64. Bore 98 contains a plurality of axially extending longitudinal slots 100 which enable axial passage of pressurized gas from feedline 60 into delivery bore 70. Additionally, an o-ring seal 102 is formed in plate 42 for positively sealing hole 96 in plate 42 with fastener 94.

FIG. 3 illustrates the closed configuration of mold assembly 10 following the open configuration depicted in FIG. 2. Once the pair of platens 34 and 36 have been closed, plug support plate 42 is raised, stretching plastic web 22 as plug 44 is raised into cavity 46 via mounting post 64 and plug support plate 42. As shown in the configuration of FIG. 3, lip flange 90 fully circumferentially engages a portion of web 22 within circumferential receiving groove 68, forming a seal there along. Additionally, the compliant and resilient action of o-ring 80 ensures that plug 44 is completely received within cavity 46, even where slight mismatch occurs between top platen 34, bottom platen 36, and support plate 42 due to the configuration of a large number of mold assemblies 10 within press 16, or due to part wear and mismatch. Hence, mounting o-ring 80 acts as a spring which ensures positive biasing and retention of each plug 44 within each receptacle 46, even where slight vertical mismatch or misalignment has occurred between platens of the press.

Wood mold 76 of plug 44 can be properly sized and tailored in order to adjust the stretching of heated web 22 during insertion of plug 44 within cavity 46. For example, portions of mold 76 can be formed from materials having different capacities for heat retention, causing associated regions of web 22 in contact with such portions to either stretch or cool, there along. Additionally, or alternatively, various regions of mold 76 can be heated, encouraging stretching of web 22 in the corresponding region there along. Hence, the resulting product produced between plug 44 and cavity 46 can have a tailored thickness, by tailoring the stretching of desired portions of web 22 during insertion of plug 44 into cavity 46. Likewise, radiuses formed along portions of mold 76 can be adjusted to produce a suitable article having a desired thickness there along.

Once plug 44 has been fully inserted into cavity 46, stretching web 22 therein as shown in FIG. 3, pressure is applied via feedline 60, bore 70 and ports 74 and 75, causing web 22 to press into cavity 46, and encouraging article formation and cooling therein. Currently, or immediately thereafter, a vacuum is applied via vacuum feedlines 56, further encouraging the feeding of web 22 within cavity 46, and encouraging clean and accurate formation of surface contours within the cavity 46 of the mold.

FIG. 4 illustrates an alternatively constructed mold assembly 110 having a plug 144 that is movably carried between lowered and raised positions by plug support plate 42, via fastener 94. According to this device, top platen 34 and bottom platen 36 are constructed similar to the platens depicted in FIGS. 1–3. Hence, cavity 46 and top platen 34 are identical to that depicted in FIG. 2, including vacuum feedlines 56. However, plug 146 is modified from the construction shown in FIG. 2, wherein a modified construction for mounting post 164 is also depicted.

According to the construction of FIG. 4, mounting post 164 is mounted with fastener 94 to support plate 42, similar to the construction of mold assembly 10, of FIG. 3. Pressurized gases are delivered to the concave side of web 22 via feedline 60 and an axial delivery bore 170 contained within post 164. However, post 164 terminates in a bezel-shaped base 184 which carries a resilient mounting o-ring 180 within a receiving groove 182 formed therein. A plurality of threaded fasteners 186 mount to an upper bezel 188 in resilient, or compliant relation atop bezel-shaped base 184. A plurality of slightly enlarged bores 188, each containing seals 189, enable each fastener 186 to axially slide therethrough as o-ring 180 is slightly deformed during engagement of plug 144 within cavity 46. Hence, seal 180 provides a spring which ensures a compliant seating of plug 144 within cavity 46 during operation of press 116.

As a result of the compliance, each mold assembly 110 of an array of such assemblies in press 116 will be assured of producing uniform positive engagement, drawing web 22 into the desired article shape, and producing more consistent and uniform articles 52 as a consequence thereof. The remaining construction of press 116 is identical to that disclosed in the FIG. 1–3 embodiment. Wooden mold 176 is also retained atop upper bezel 188 by fasteners 186. Furthermore, a central feedline 75 supplies pressurized gas to the top surface of plug 144, as well as to the side via side ports 174. The remaining features of press 116 are readily apparent from the device 16 disclosed in FIGS. 1–3.

It is to be understood that additional mold features that are not related to the present invention have been omitted in order to simplify FIGS. 2–4. For example, it is generally know in the art to include a stripping device in top platen 34 (as shown in FIGS. 2–4) for facilitating removal of articles from die cavities 46. One typical stripper construction involves the placement of a spring loaded bolt that extends through the platen between each cavity 46, in a construction similar to that depicted in FIG. 2. A stripper plate is mounted to the bottom of the bolt, in the bottom face of the platen between adjacent cavities. The spring holds the bolt and stripping plate in a lowered position from the bottom platen face. The spring loaded bolt has a head that extends through the top part of the platen with a rubber snubbing washer therebelow, such that when the grid is raised in contact with the platen between the cavities each associated stripper plate is forcibly raised into flush position with the platen's bottom face. However, once the platen has been raised from the grid, the spring loaded snubber biases the snubber plates downwardly from the platen, causing molded articles formed in the die cavities to be ejected therefrom. However, when molding simple articles such as those depicted in FIGS. 2–4, the use of a snubber is not necessary. Snubber use is important where multiple or complex mold features are provided on an article, or where a large number of reinforcing ribs are included in the side wall constructions of an article.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A thermo-forming press mold assembly having a first platen and a second platen movably engageable therebetween, comprising:

a first die member configured to be carried by the first platen;

a second die member configured to be compliantly carried by the second platen, and constructed and arranged to mate in substantially aligned registry with the first die member as the first and second platens are movably engaged;

a multidimensional resilient member disposed between the second die member and the second platen, the resilient member constructed and arranged to impart substantially aligned registry by providing vertical and lateral compliance between the first and second die members when brought together about a web of plastic material to be formed as the first and second platens are movably engaged to form an article from the web therebetween during a thermo-forming cycle.

2. The assembly of claim 1 wherein the first die member comprises a cavity of the first platen.

3. The assembly of claim 2 wherein the second die member comprises a plug of the second platen, wherein the plug is advanced into a sheet of heated plastic web, forcing the web into the cavity to produce an article therein.

4. The assembly of claim 1 wherein the resilient member comprises an o-ring.

5. The assembly of claim 1 wherein the plug comprises a base bezel and a male mold member carried on the base bezel, and the assembly further comprises a mounting post configured to carry the plug and the resilient member on the second platen, the resilient member interposed between the male mold member and the post so as to provide vertical and lateral compliance there between.

6. The assembly of claim 5 wherein the resilient member comprises an o-ring, the plug comprises a tube on which the male mold member is carried, with the o-ring being received within the tube and the mounting post being received within the tube to engage with the o-ring.

7. The assembly of claim 1 wherein the first die comprises a circumferential seal and the second die comprises a lip flange, the circumferential seal and the lip flange constructed and arranged to mate in engagement upon mating of the respective die about a web being formed there between, forming a web seal there along.

8. The assembly of claim 7 wherein the circumferential seal and the lip flange coact to provide a self-cutting feature there between.

9. A thermo-forming press mold assembly having a first platen and a second platen movable there between, comprising:
   a first die member carried by the first platen;
   a second die member compliantly carried by the second platen, and constructed and arranged to mate with the first die member, a web of material to be formed being received between the mated first and second die members;
   a multiaxial resilient member disposed between one of the die members and an associated one of the platens, the resilient member imparting three-dimensional compliant engagement between the first and second die members to ensure substantially aligned registry when brought together about the web of material during a thermo-forming cycle.

10. The assembly of claim 9 wherein the resilient member comprises an o-ring.

11. The assembly of claim 9 wherein the first die member comprises a cavity carried by the first platen.

12. The assembly of claim 11 wherein the second die member comprises a plug carried by the second platen and the web comprises a sheet of heated plastic material, the plug movably supported for advancement into the web, drawing the web into the cavity to form an article therein.

13. The assembly of claim 12 wherein the resilient member comprises an o-ring interposed between the plug and the second platen, the plug, o-ring and second platen cooperating to provide vertically and laterally compliant engagement of the plug and the cavity, and the web being received and formed there between.

14. The assembly of claim 9 wherein the plug comprises a base bezel and a male mold member carried on the base bezel, and the assembly further comprises a mounting post configured to carry the plug and the resilient member on the second platen, the resilient member interposed between the male mold member and the post so as to provide vertical and lateral compliance there between.

15. A thermo-forming press mold assembly, comprising:
   a pair of platens supported for relative movement during a thermo-forming operation;
   a pair of complementary, mating die members, one of the die members carried by one of the platens and the other of the die members carried by the other of the platens;
   a multiaxial resilient member disposed between one of the die members and an associated one of the platens and operative to impart compliance between the one die member and the associated platen to ensure substantially aligned registry between the pair of die members when brought together about a web of material during a thermo-forming cycle.

16. The mold assembly of claim 15 wherein the multiaxial resilient member comprises a resilient O-ring.

* * * * *

UNITED STATES PATENT AND TRADEMARK OFFICE
CERTIFICATE OF CORRECTION

PATENT NO. : 5,773,540
DATED : June 30, 1998
INVENTOR(S) : Jere F. Irwin

It is certified that error appears in the above-identified patent and that said Letters Patent is hereby corrected as shown below:

In the Abstract

Line 7, delete "Aa" and insert --A--.

Col. 4, line 50, delete "drive" and insert --driven--.

Col. 5, line 11, delete "it's" and insert --its--.

Col. 5, line 13, delete "it's" and insert --its--.

Col. 7, line 64, delete "know" and insert --known--.

Signed and Sealed this

Twenty-second Day of June, 1999

Attest:

Q. TODD DICKINSON

*Attesting Officer*     Acting Commissioner of Patents and Trademarks